(12) United States Patent
Hsiang

(10) Patent No.: US 10,779,007 B2
(45) Date of Patent: Sep. 15, 2020

(54) TRANSFORM CODING OF VIDEO DATA

(71) Applicant: MEDIATEK INC., Hsinchu (TW)

(72) Inventor: Shih-Ta Hsiang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/928,917

(22) Filed: Mar. 22, 2018

(65) Prior Publication Data

US 2018/0278958 A1  Sep. 27, 2018

Related U.S. Application Data

(60) Provisional application No. 62/475,245, filed on Mar. 23, 2017.

(51) Int. Cl.

| | | |
|---|---|---|
| *H04N 19/176* | (2014.01) | |
| *H04N 19/44* | (2014.01) | |
| *H04N 19/50* | (2014.01) | |
| *H04N 19/517* | (2014.01) | |
| *H04N 19/593* | (2014.01) | |
| *H04N 19/51* | (2014.01) | |
| *H04N 19/60* | (2014.01) | |
| *H04N 19/157* | (2014.01) | |
| *H04N 19/12* | (2014.01) | |

(Continued)

(52) U.S. Cl.
CPC ............ *H04N 19/60* (2014.11); *H04N 19/12* (2014.11); *H04N 19/157* (2014.11); *H04N 19/176* (2014.11); *H04N 19/186* (2014.11); *H04N 19/70* (2014.11)

(58) Field of Classification Search
CPC .... H04N 19/176; H04N 1/186; H04N 19/159; H04N 19/46; H04N 19/593; H04N 19/122; H04N 19/60
See application file for complete search history.

(56) References Cited

U.S. PATENT DOCUMENTS 9,300,974 B2 * 3/2016 Lee ..................... H04N 19/105
9,426,466 B2 * 8/2016 Van der Auwera .........................
H04N 19/176

(Continued)

FOREIGN PATENT DOCUMENTS

| CN | 104396245 A | 3/2015 |
|---|---|---|
| CN | 105723707 A | 6/2016 |

OTHER PUBLICATIONS

Combined Office Action and Search Report dated Feb. 27, 2019 in Taiwanese Patent Application No. 107110028, 7 pages (with English translation of categories of cited documents).

(Continued)

*Primary Examiner* — Alison Slater
(74) *Attorney, Agent, or Firm* — Oblon, McClelland, Maier & Neustadt, L.L.P.

(57) ABSTRACT

A picture defined in video data is partitioned into blocks that include a luminance (luma) transform block and a chrominance (chroma) transform block. One or more constraints pertaining to the picture are determined from high-level syntax elements and transform skipping of one of both of the luma transform block and the chroma transform block is disallowed if the constraints are not met. The video data are encoded in a bitstream along with an indication that the transform of the luma transform block or the chroma transform block is skipped in response to the transform being skipped.

6 Claims, 12 Drawing Sheets

(51) Int. Cl.
*H04N 19/186* (2014.01)
*H04N 19/70* (2014.01)

(56) References Cited

U.S. PATENT DOCUMENTS

| | | | | |
|---|---|---|---|---|
| 2013/0294524 A1* | 11/2013 | Van Der Auwera | .......................... | H04N 19/176 |
| | | | | 375/240.18 |
| 2013/0343464 A1* | 12/2013 | Van der Auwera | .......................... | H04N 19/157 |
| | | | | 375/240.18 |
| 2014/0226721 A1* | 8/2014 | Joshi | .................... | H04N 19/159 |
| | | | | 375/240.13 |
| 2015/0326863 A1* | 11/2015 | Francois | .............. | H04N 19/176 |
| | | | | 375/240.24 |
| 2015/0326883 A1* | 11/2015 | Rosewarne | .......... | H04N 19/119 |
| | | | | 375/240.18 |
| 2016/0057430 A1* | 2/2016 | Kolesnikov | .......... | H04N 19/159 |
| | | | | 375/240.12 |
| 2017/0214912 A1* | 7/2017 | Cote | ....................... | H04N 19/11 |
| 2019/0104322 A1* | 4/2019 | Tsukuba | ............... | H04N 19/124 |

OTHER PUBLICATIONS

Rec. ITU-T H.265 ISO/IEC 23008-2 version 3 High efficiency video coding, Apr. 2015.
J. Chen, et al, "Algorithm Description of Joint Exploration Test Model 5," Joint Video Exploration Team of ITU-T SG 16, WP3 and ISO/TEC JTCI/SC:29/WG11, JVET-E1001, 5th Meeting: Geneva, CH, Jan. 12-20, 2017.

\* cited by examiner

TRANSFORM CODING OF VIDEO DATA

RELATED APPLICATION DATA

This application priority under 35 U.S.C. § 119(e) from U.S. Provisional Patent Application No. 62/475,245 entitled "Methods and Apparatus for Transform Coding," filed Mar. 23, 2017, the entire disclosure of which incorporated herein by reference.

BACKGROUND

High-efficiency video coding (HEVC) is the latest video coding standard developed by the Joint Collaborative Team on Video Coding (JCT-VC) that combines expertise of both the International Telecommunication Union (ITU) and the International Organization for Standardization/International Electrotechnical Commission (ISO/IEC). Like its predecessor, advanced video coding (AVC), HEVC uses high-level syntax (HLS) elements to define the structure of the output bitstream and to provide information that applies to multiple pictures or to multiple coded block regions within a picture. HLS elements may be carried in parameter sets that contain control information in accordance with which video data are encoded and subsequently decoded.

Among other things, parameter sets include information that compels various encode/decode operations to be overridden or bypassed. For example, in conventional coding operations, a transform is performed on a block of data to convert the sample data contained in the block into its frequency representation. While this may improve coding efficiency on blocks having certain characteristics, e.g., highly variable graphic content, higher coding efficiency of some blocks is achieved if the transform operation is omitted. Accordingly, in HEVC, a block of video data can be coded without a transform operation, referred to as transform skipping, which is indicated by an HLS element transform_skip_flag. When transform_skip_flag is equal to one (1), the associated data block is coded in the transform skip mode. Otherwise, a transform is applied to the associated block.

SUMMARY

The present inventive concept encompasses techniques that improve efficiency by controlling the transform skip mode in a video coding system. A picture defined in video data is partitioned into blocks that include a luminance (luma) transform block and a chrominance (chroma) transform block. One or more constraints pertaining to the picture are determined from high-level syntax elements and transform skipping of one of both of the luma transform block and the chroma transform block is disallowed if the constraints are not met. The video data are encoded in a bitstream along with an indication that the transform of the luma transform block or the chroma transform block is skipped in response to the transform being skipped

DETAILED DESCRIPTION

Figure 1:
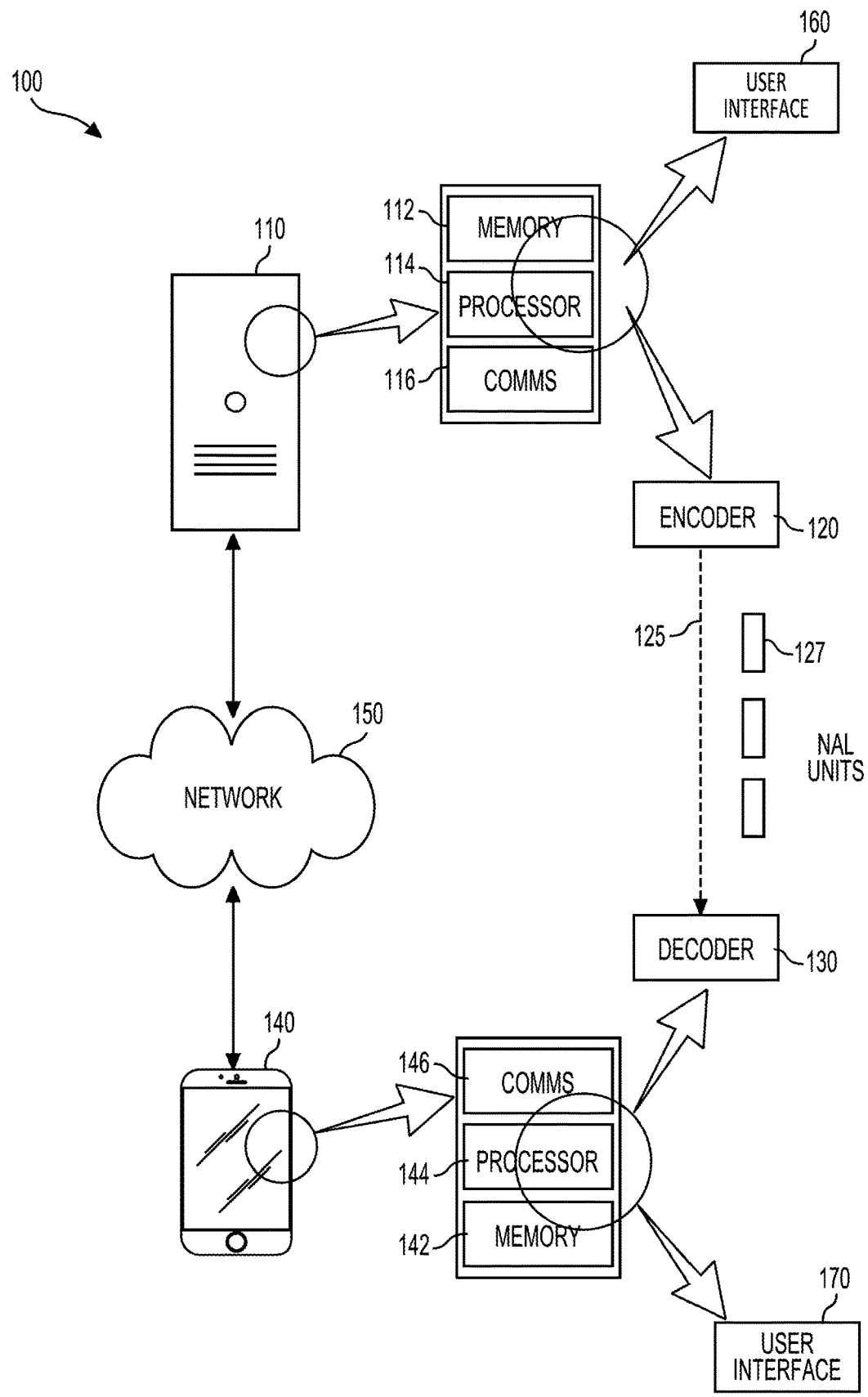
FIG. 1 is schematic block diagram of an example system in which the present inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

FIG. 1 is schematic block diagram of an example system 100 in which the present invention can be embodied. System 100 may include one or more server devices 110 and one or more client devices 140 communicatively coupled through a communications network 150. Server device 110 may include memory circuitry 112, processor circuitry 114 and communication circuitry 116, which may be utilized to implement an encoder 120. Similarly, client device 140 may include memory circuitry 142, processor circuitry 144 and communication circuitry 146, which may be utilized to implement a decoder 130. It is to be understood that circuitry that realizes encoder 120 and decoder 130 may be a part of a general microprocessor or similar device, or may be implemented in dedicated processing circuitry. The encoder 120 and decoder 130 may process video data following a video coding standard (for example, high efficiency video coding (HEVC) or any other video coding standard). Server device 110 may be constructed or otherwise configured to deliver video content to client device 140 through network 150.

As illustrated in FIG. 1, exemplary encoder 120 processes video data into a bitstream 125. In some embodiments, the bitstream 125 can be forwarded through a data transmission interface (for example, a network 150 in network access layer (NAL) units 127). NAL units 127 may be categorized into video coding layer (VCL) NAL units and non-VCL NAL units. VCL NAL units contain the data that represent samples of the video pictures and non-VCL NAL units contain any associated additional information, such as parameter sets and supplemental enhancement information (timing information and other supplemental data that may enhance usability of the decoded video signal but are not necessary for decoding the values of the samples in the video pictures). In some other embodiments, the bitstream 125 may be transmitted using any other data transmission interface or be stored in a storage medium.

Figure 2:
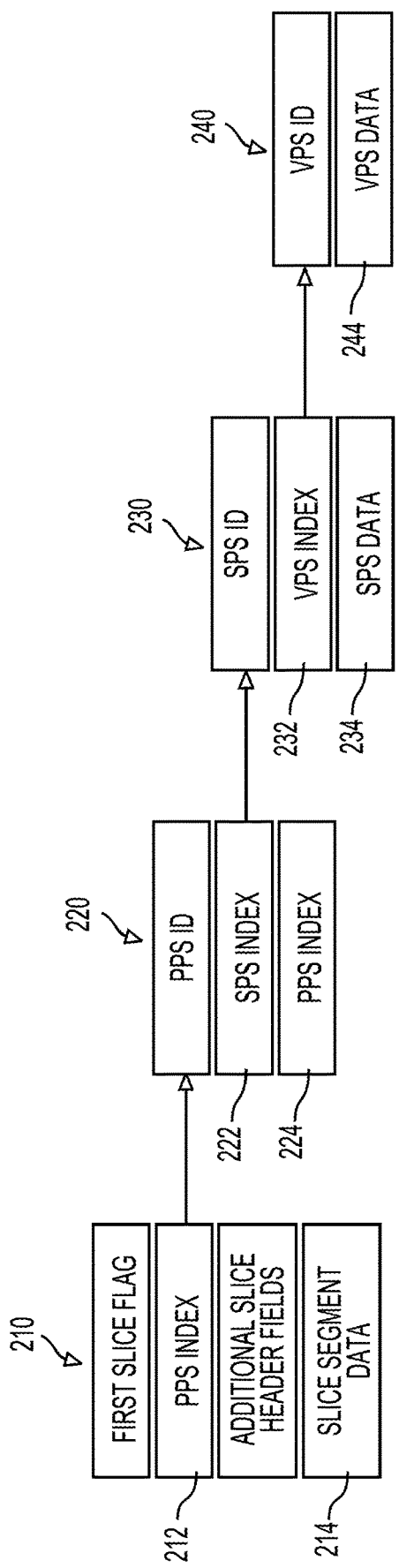
FIG. 2 is a diagram of example data structures that realize parameter sets with which the present inventive concept can be embodied.

FIG. 2 is a diagram of example data structures that realize the parameter set mechanism. Aspects of the coding and decoding of video data proceeds in accordance with high level syntax (HLS) elements that are contained in a picture parameter set (PPS) 220 that establishes control over processing at the picture level, a sequence parameter set (SPS) 230 that establishes control over processing at the picture sequence level, and a video parameter set VPS 240 which establishes control over data layers and/or multi-view aspects of video coding processing. Such HLS elements signal the various components of encoder 120 and decoder 130 as to how the video data are to be processed.

The parameter-set mechanism decouples the transmission of infrequently changing information from the transmission of coded picture samples. Each VCL NAL unit, e.g., VCL NAL unit 210, contains a PPS index 212 that refers to the content of the relevant PPS 220, each PPS 220 contains an SPS index 224 that refers to the content of the relevant SPS 230 and each SPS 230 contains a VPS index 234 that refers to the content of the relevant VPS 240. In this manner, a small amount of data, i.e., the index, can be used to refer to a larger amount of information, i.e., the parameter set carried in PPS data 224. SPS data 234 and VPS data 244, without repeating that information within each VCL NAL unit 210. Video, sequence and picture parameter sets can be sent well ahead of the VCL NAL units to which they apply and can be repeated to provide robustness against data loss. In some applications, parameter sets may be sent within the channel that the VCL NAL units are conveyed (termed "in-band" transmission). In other applications, it can be advantageous to convey the parameter sets "out-of-band" using a more reliable transport mechanism than the video channel itself.

Figure 3:
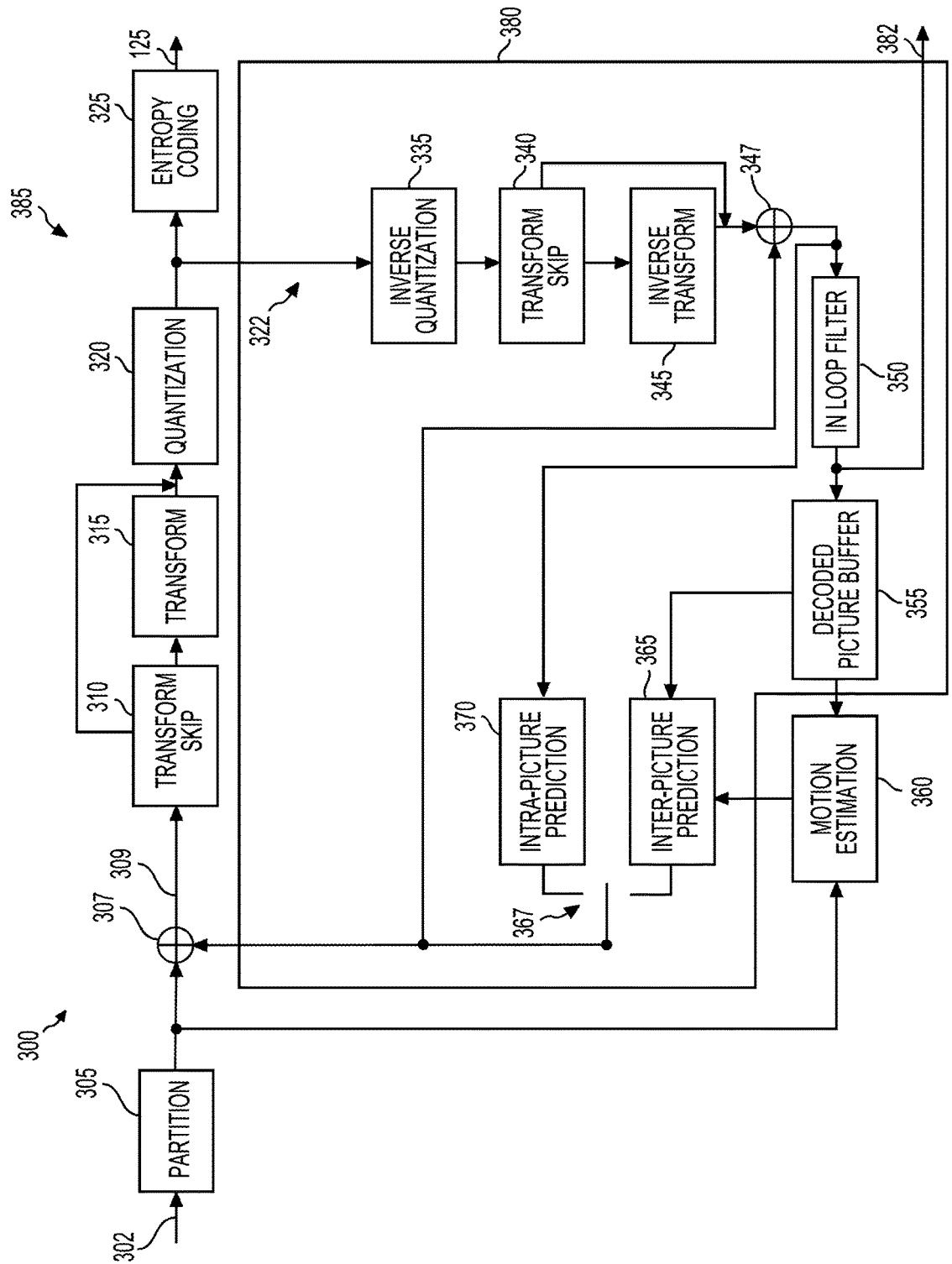
FIG. 3 is a schematic block diagram of an example encoder by which the present inventive concept can be embodied.

FIG. 3 is a schematic block diagram of a video encoder 300 that performs the functionality of encoder 120. Those skilled in the video arts will recognize from the following general overview that much of the functionality of codec 300 is conventional and will fully understand its operation without specific implementation details. Such implementation details will thus be omitted in the interest of conciseness except where such detail will enhance comprehension of the present invention. It is to be understood, however, that the present invention is not limited to specific codec architecture or to specific components to carry out the operations of encoder 300. The aforementioned skilled artisans will recognize various codec configurations in which the present invention can be implemented upon review of this disclosure. In FIG. 3, circuitry located within boundary 380 performs reconstruction, functionality of which is similar to the decoder 130.

Figure 4:
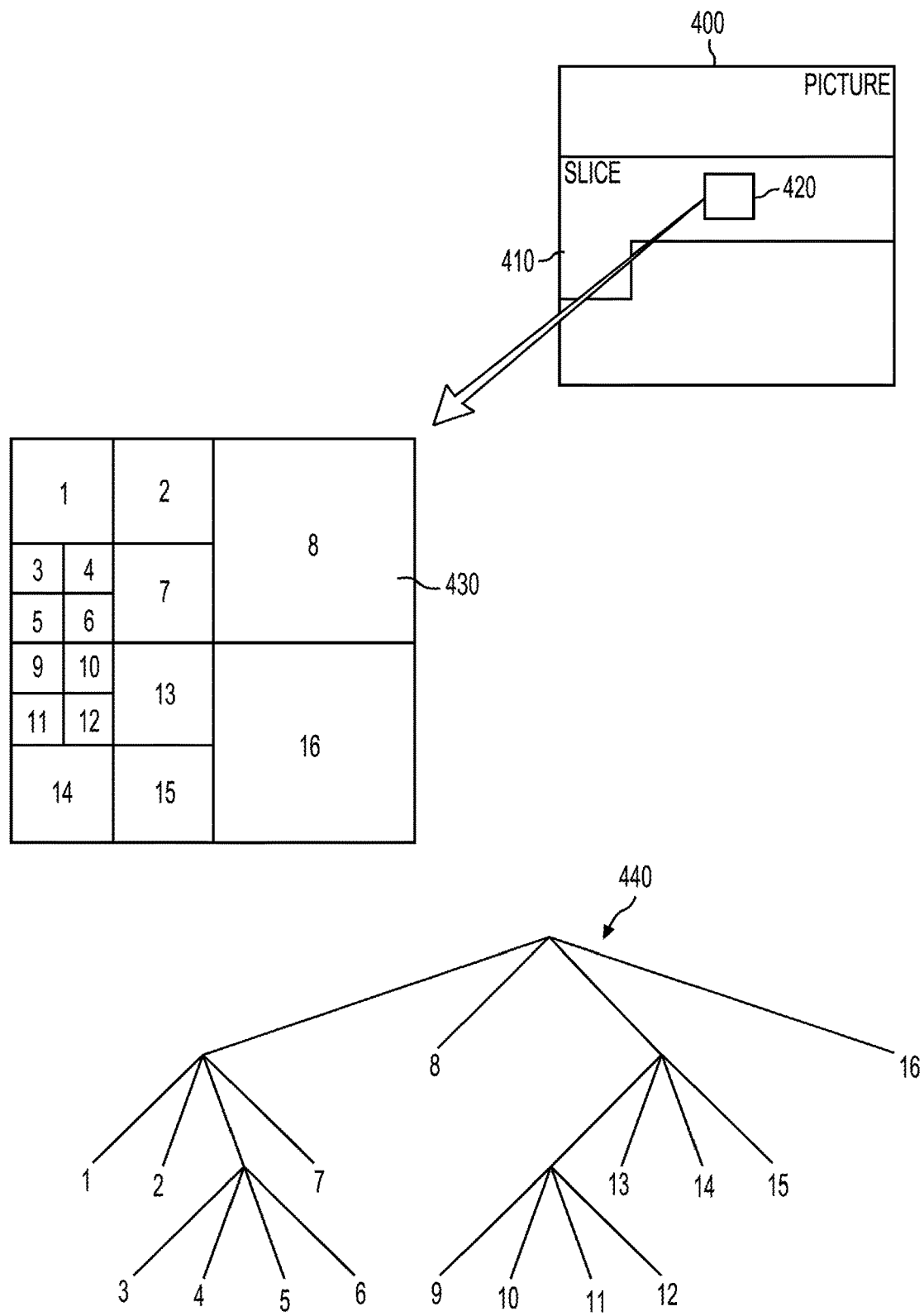
FIG. 4 is a diagram of example video data partitioning with which the present inventive concept can be embodied.

Video input data 302 are provided to partition component 305, which may partition the video pictures according to a quadtree representation 440 illustrated in FIG. 4. In HEVC, a coded picture 400 is represented by a plurality of coded slices, representatively illustrated at slice 410. Each slice 410 is partitioned into non-overlapping coding tree units (CTUs), representatively illustrated at CTU 420. The CTU size is specified by a syntax element (for example, a syntax element in SPS 230) and ranges from 16×16 to 64×64 in the Main profile. A CTU can be further partitioned into one or multiple coding units (CUs) 430 to adapt to varying local statistical characteristics. The number at the leaves of quadtree data structure 440 corresponds to the number indicated in respective CUs 430 and defines the coding order of the CUs 430.

Figure 5:
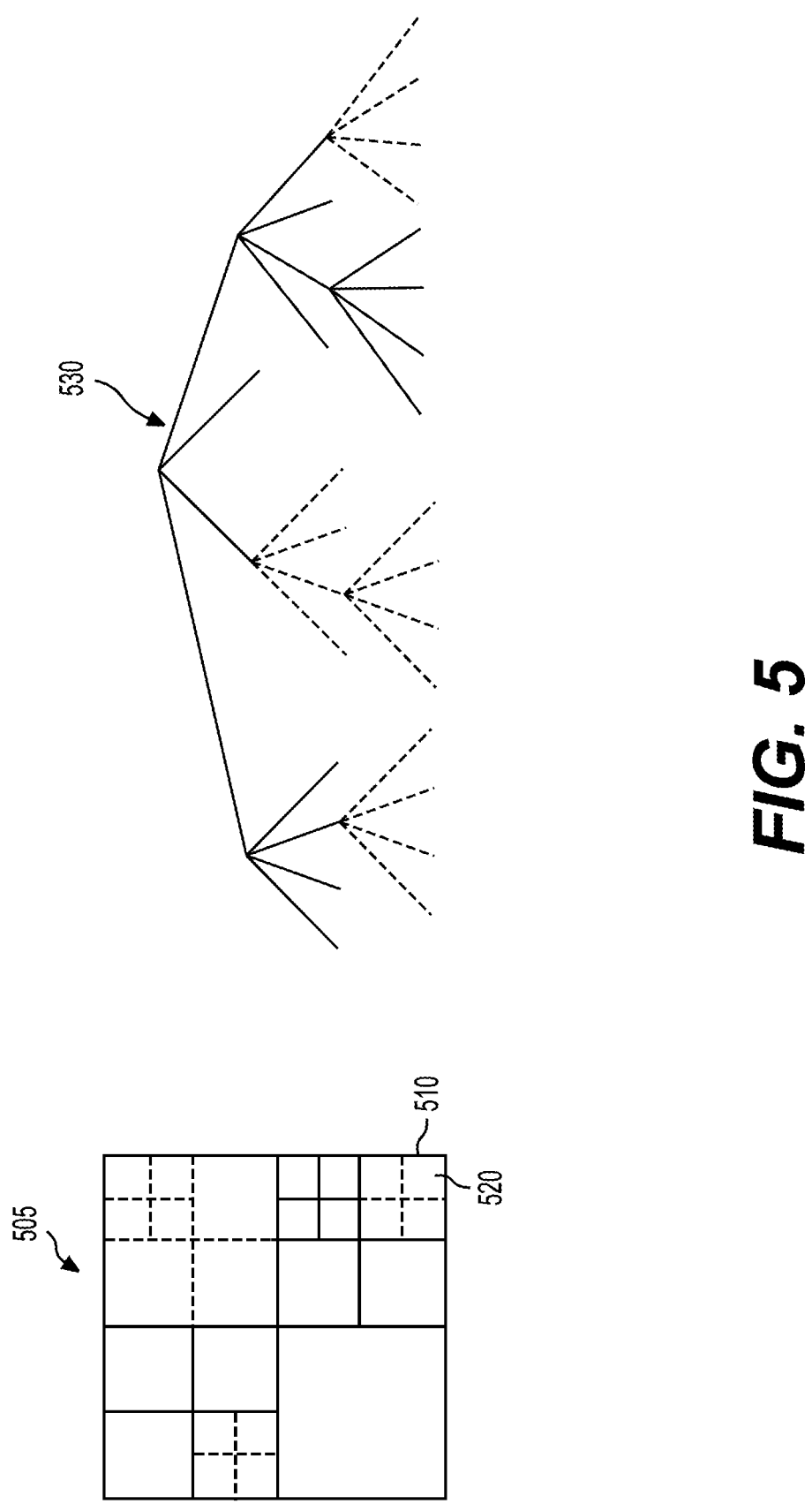
FIG. 5 is a diagram of further video data partitioning with which the present inventive concept can be embodied.

As illustrated in FIG. 5, each CU 505 can be further divided into one or multiple prediction units (PUs) 510. PU 510 works as a basic operation unit for predicting sample values in a block region. CUs can be further partitioned into transform units (TUs) 520 comprising transform blocks (TBs). A TB represents a block of samples of a color component on which a two-dimensional transform is applied. The partitioning of a luma CB into luma TBs, for example, is carried out recursively based on the quadtree approach. The corresponding structure, referred to as a residual quadtree (RQT) 530, determines for each luma CB at the root of the RQT a collection of luma TBs at the leaves of the RQT in such a way that the union of corresponding disjoint luma TBs is covering the whole associated luma CB.

Figure 6:
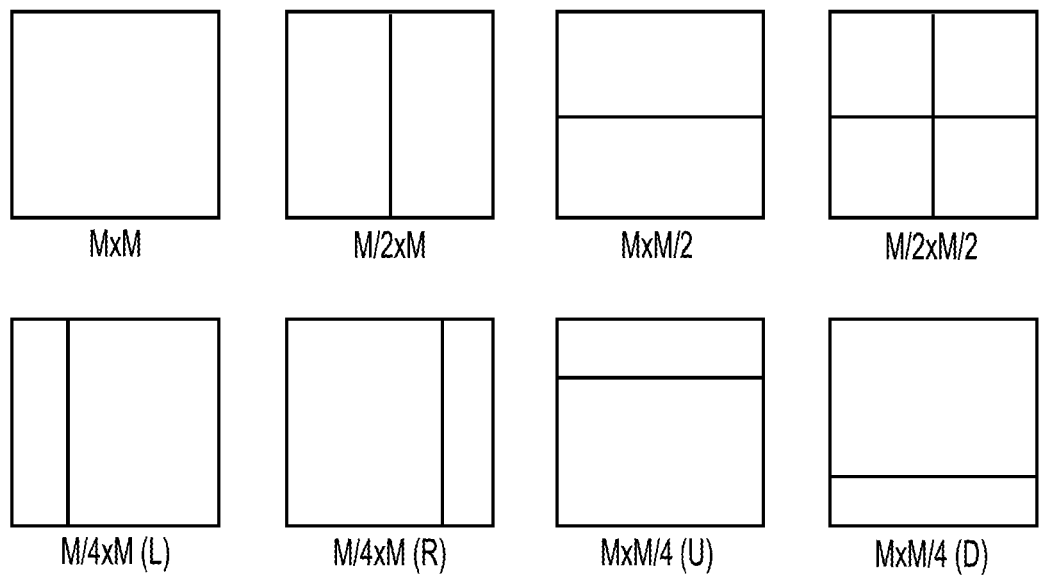
FIG. 6 is an illustration of example rectangular block partitions that can be used in embodiments of the present inventive concept.
Figure 7:
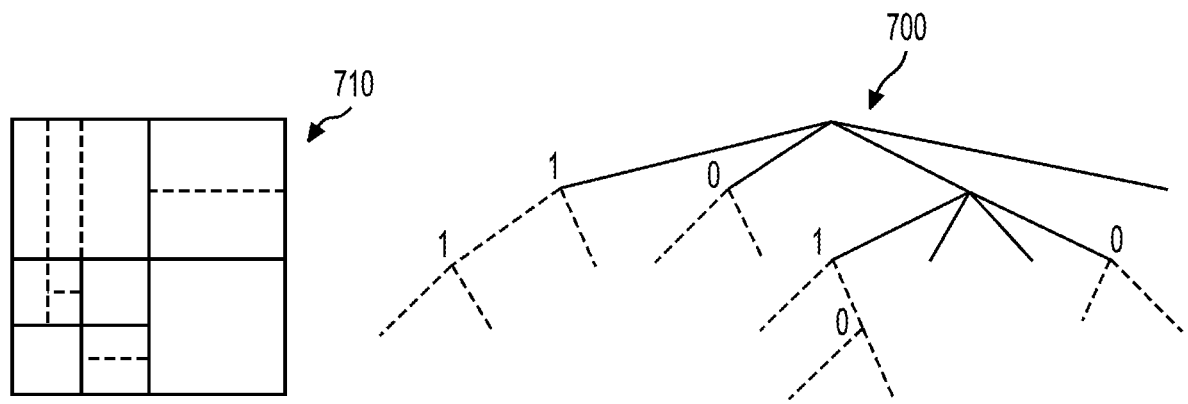
FIG. 7 is a diagram of another example video data partitioning technique with which the present inventive concept can be embodied.

The present invention is not limited to square blocks; rectangular blocks may also be used for the coding described below. Examples of rectangular block partitions are illustrated in FIG. 6. Indeed, the Joint Video Expert Team (JVET) of ITU and ISO/IEC is currently conducting research on the next-generation international video coding standard. In Joint Exploration Test Model 5 (JEM5) a quadtree plus binary tree (QTBT) 700 structure, as illustrated in FIG. 7, is utilized for partitioning a CTU 710 into one or multiple CUs. Each CU contains only one PU and only one TU. The resulting TB dimension can range from 128×128 to 2×2 and can take a square or rectangular shape. In an Intra slice, each CTU can be partitioned into two separate coding trees for one luma component and two chroma components, respectively.

It is to be understood that the present invention is not limited to particular partitioning techniques. The foregoing partitioning techniques represent certain possible partitions that can be used in conjunction with the present invention without departing from the spirit and intended scope thereof.

Returning now to FIG. 3, partitioned video data are provided to summing component 307, at which reconstructed picture data (i.e., previously encoded and decoded picture data) are also provided. The predicted picture data derived from previously processed picture data are subtracted from the current picture data to produce residual signal 309. Residual signal of TBs 309 are provided to transform skip component 310, which determines whether transform processing, performed by transform component 315, is applied to a TB. As part of the encoding process, the encoder 300 may test a number of different coding scenarios to determine a scenario that produces a desired rate-distortion tradeoff. As part of testing these various scenarios, the encoder 300 may, for example, test scenarios that include encoding some TBs in a transform mode while in other scenarios those TBs may be encoded in a transform skip mode. Transform skip component 310 may make such determination from characteristics of the TB as well as constraints and other control information provided in HLS elements, such as those described below. If a transform is to be performed, the residual signal of the TBs 309 may be provided to transform component 315. In transform component 315, the TUs are subjected to a transform, such as a finite precision approximation of the discreet cosine transform known to those skilled in the video coding technology. The transformed data are represented through transform coefficients which may then be quantized at quantization component 320. The quantized coefficients may then be entropy encoded by entropy encoding component 320 into bitstream 125. The quantized coefficients may also be provided to reconstruction circuitry 380 that first inverse quantizes the coefficients at inverse quantization component 335. The inverse quantized coefficients may then be provided to transform skip component 340 and then to inverse transform component 345, provided transform skip component 340 determines that the data under scrutiny are to be inverse transformed. The inversely transformed data may be provided to summing component 347 at which they are added to predictive block data. The reconstructed block is then filtered through in-loop filter 350, which may comprise deblocking and sample adaptive offset functions known to those familiar with the video coding technology. The filtered data are a reconstructed video picture and are provided to decoded picture buffer 355, where the data serve as reference pictures.

As illustrated in FIG. 3, current picture data may also be provided to motion estimation component 360. Motion estimation component 360 may be configured to determine the prediction mode, i.e., intra-picture prediction or inter-picture prediction, for a video slice according to a predetermined pattern for a video sequence. Motion estimation unit 360 may generate motion vectors, which indicate motion in video blocks. A motion vector, for example, may indicate the displacement of a PU of a video block within a current video frame or picture relative to a predictive block within a reference picture. A predictive block is a block that is found to closely match the PU of the video block to be coded. Motion estimation component 360 may perform a motion search relative to full pixel positions and fractional pixel positions and output a motion vector with fractional pixel precision. Motion estimation component 360 calculates a motion vector for a PU of a video block in an inter-coded slice by comparing the position of the PU to the position of a predictive block of a reference picture. The reference picture may be selected from reference picture lists that identify one or more reference pictures stored in decoded picture buffer 355.

Inter-picture prediction component 365 may generate the predictive block based on the motion vector determined by motion estimation component 360, possibly performing interpolations to sub-pixel precision. Upon receiving the motion vector for the PU of the current video block, inter-picture prediction component 365 may locate the predictive block to which the motion vector points in one of a plurality of reference picture lists. Inter-picture prediction component 365 determines whether forward and bi-directional prediction is used on particular blocks.

Intra-picture prediction component 370 may determine an intra-prediction mode to use to encode a current block. Intra-picture prediction component 370 may encode a current block using various intra-prediction modes, such as through performing encoding passes, and intra-picture prediction component 370 may select an appropriate intra-prediction mode to use from the tested modes. For example, intra-picture prediction component 370 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-picture prediction component 370 may calculate ratios from the distortions and rates for the various encoded blocks to determine which intra-prediction mode exhibits the best rate-distortion value for the block.

Selector component 367 selects either inter-picture prediction or intra-picture prediction and provides the corresponding predictive block to summing component 307. Summing component 307 forms a residual video block by subtracting pixel values of the predictive block from the pixel values of the current video block being coded, forming pixel difference values. The pixel difference values form residual data for the block, and may include both luma and chroma difference components.

Quantized coefficients from quantization component 320 are provided to inverse quantization component 335 and then to transform skip component 340, which is described further below. If an inverse transform is to be performed (not skipped), the inverse-quantized transform coefficients are provided to inverse transform component 345.

Figure 12:
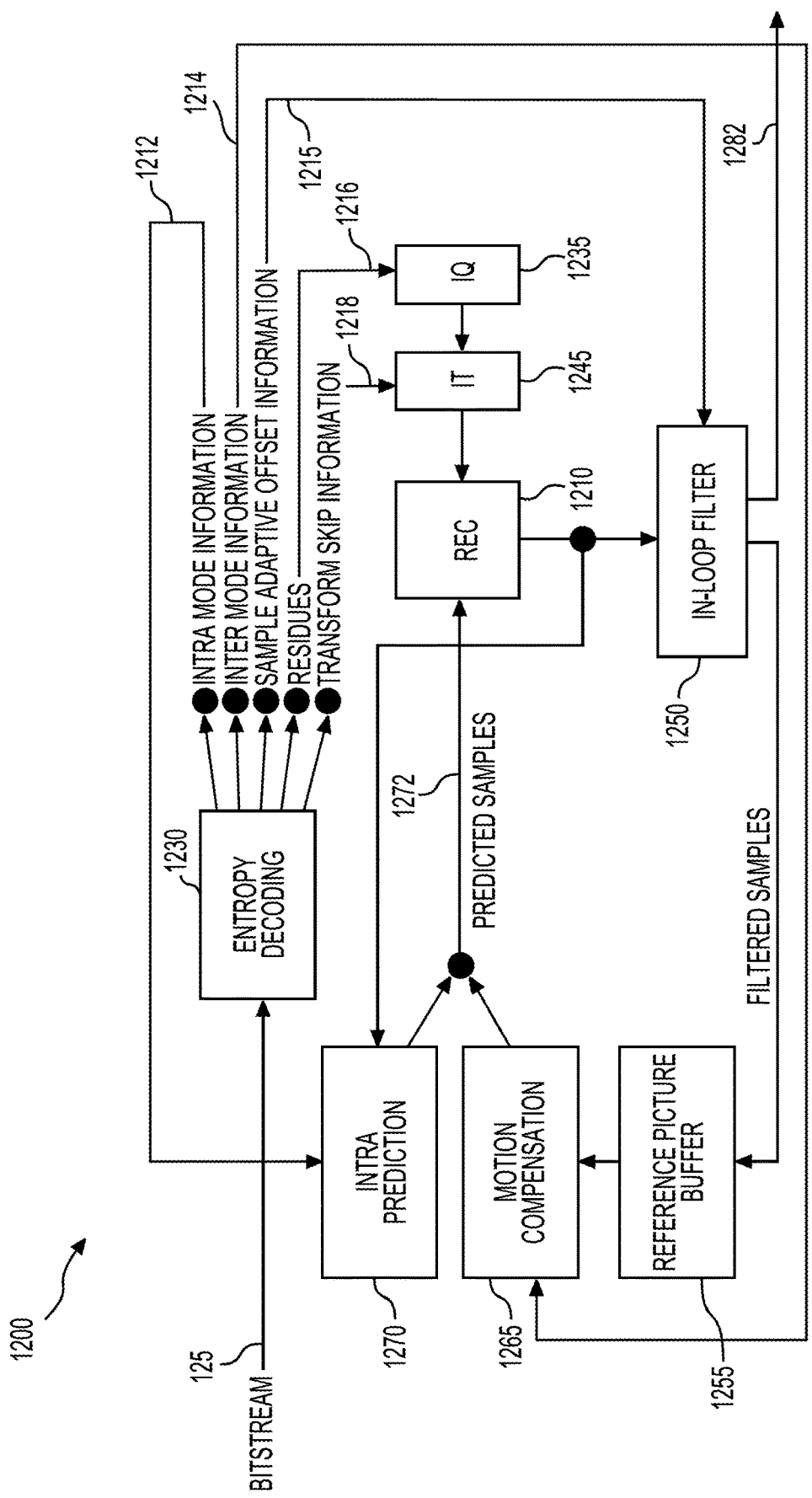
FIG. 12 is a schematic block diagram of an example decoder by which the present inventive concept can be embodied.

FIG. 12 is a schematic block diagram of a video encoder 1200 that performs the functionality of decoder 130 of FIG. 1. At decoder circuitry 1200, bitstream 125 is first entropy decoded by entropy decoding component 1230. Entropy decoding component 1230 provides information that was signaled by encoder 120 so that decoder 130 properly reconstructs the video on video output 1282. Such information includes, among other information known to skilled artisans, intra mode information 1212, inter mode information 1214, sample adaptive offset (SAO) information 1215, residues 1216 and transform skip information 1218. As illustrated in FIG. 12 and known to those skilled in the art, intra mode information 1212 is provided to intra prediction component 1270 for intra-picture decoding, inter mode information 1214 is provided to motion compensation component 1265 for inter-picture decoding, SAO information 1215 is provided to in-loop filter 1250 for in-loop filtering and transform skip information 1218 is provided to inverse transform component 1245 for transform skipping, as described below.

Residues 1216 are inverse-quantized by inverse quantization component 1335 and then provided to inverse transform component 1245. The state of transform skip flag encoded in bitstream 125 as transform skip information 1218 signals whether a transform skip operation was performed at the encoder, where transform_skip_flag=1 instructs inverse transform component 1245 to bypass the inverse transform operation, as described above, and transform_skip_flag=0 instructs inverse transform component 1245 to perform the inverse transform operation. Inverse-quantized transform coefficients provided to inverse transform component 1245 and not transform skipped are converted thereby into their spatial domain TB counterparts, which are combined with predictive samples 1272 at reconstruction component 1210. The summed data may be filtered by in-loop filter 1250 and provided as video output 1282 as well as to reference picture buffer 1255 where reconstructed pictures are used for predictive decoding.

As discussed above, a transform block can be coded without a transform operation. In HEVC, it is indicated by a syntax element transform_skip_flag signaled for a non-empty transform block (with at least one coded non-zero sample value). High-level control of this TB coding mode is signaled by the PPS syntax elements transform_skip_enabled_flag and log 2_max_transform_skip_block_size_minus2. When transform_skip_enabled_flag is equal to 1, transform_skip_flag is coded for each non-empty transform block with block width less than or equal to 1<<(log 2_max_transform_skip_block_size_minus2+2). When transform_skip_flag is equal to 1, the associated transform block is coded in the transform skip mode. Otherwise, a transform is applied to the associated transform block. The syntax element transform_skip_flag is inferred to be equal to 0 when not coded.

Figure 8:
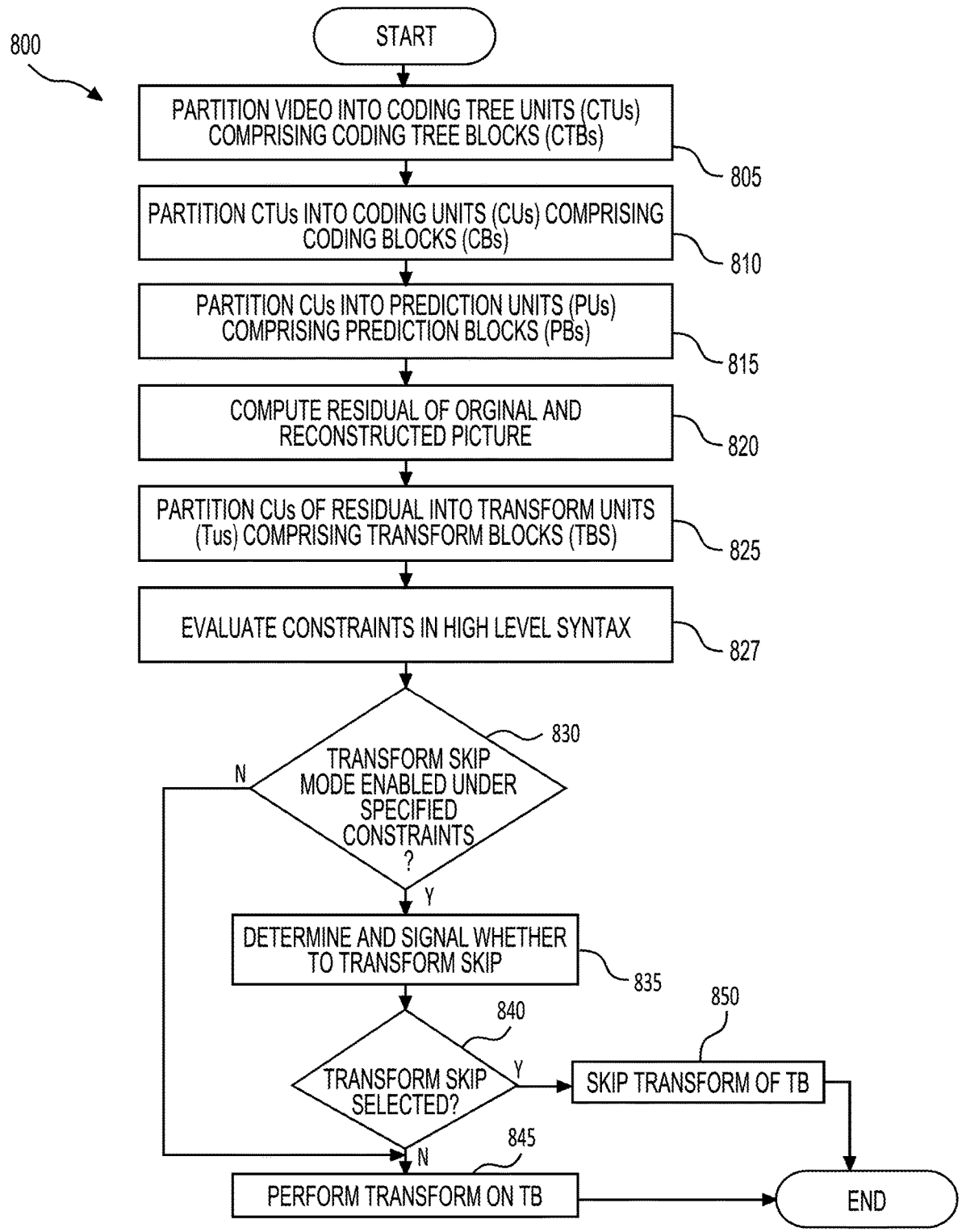
FIG. 8 is a flow diagram of an example transform skip process by which the present inventive concept can be embodied.

FIG. 8 is a flow diagram of an exemplary transform skip process 800 by which the present invention can be embodied. In operation 805, video data are partitioned into CTUs of corresponding CTBs containing separated color components. In operation 810, the CTUs are partitioned into CUs of corresponding CBs containing the separated color components. The CUs are further partitioned into PUs in operation 815 on which intra/inter prediction processing are performed. In operation 820, a residual is computed between CUs of the original picture and those of a reconstructed image produced in encoder 300. The residual signal of the CUs are partitioned into TUs, wherein the TUs comprise TBs containing separated color components in operation 825. It is to be understood that the partitioning of operations 805, 810, 815 and 825 may occur in accordance with the JEM5 discussed above, in which case each CU contains only one PU and one TU and no further partitioning is performed.

In operation 827, high level syntax elements are evaluated to determine what constraints on transform skipping are to be enforced. In operation 830, it is determined whether the transform skip mode is enabled under the specified constraints. If not, process 800 may transition to operation 845, whereby a transform is performed on the TB. If transform skipping is enabled, process 800 may transition to operation 835, whereby the TB under scrutiny is evaluated to determine whether the transform is to be skipped and to signal such to the encoder. In operation 840, it is determined from the evaluation of operation 835 whether transform skipping is selected for the TB. If so, the transform is skipped in operation 850. Otherwise, the transform is performed in operation 845.

In certain embodiments of the present invention, constraints are added on the minimum transform block dimension for enabling the transform skip mode. In this way, the transform skip mode will not be applied and signaled for small transform blocks to save complexity and bit costs. In one embodiment, high-level syntax elements are implemented to signal the minimum transform block dimension for which the transform skip mode can be enabled. For example, a PPS syntax element log 2_min_transform_skip_block_size may signal the minimum transform block size for which the transform skip mode may be applied in coded pictures referring to the PPS. The HLS element log 2_min_transform_skip_block_size may specify that the minimum transform block size in the number of block samples is equal to 1<<(log 2_min_transform_skip_block_size<<1). In another example, the transform skip mode is disabled when the current block width or height is less than log 2_min_transform_skip_block_size in coded pictures referring to the PPS. The HLS elements can be present in the syntax structures SPS, PPS, slice segment header, or CTU.

Figure 9:
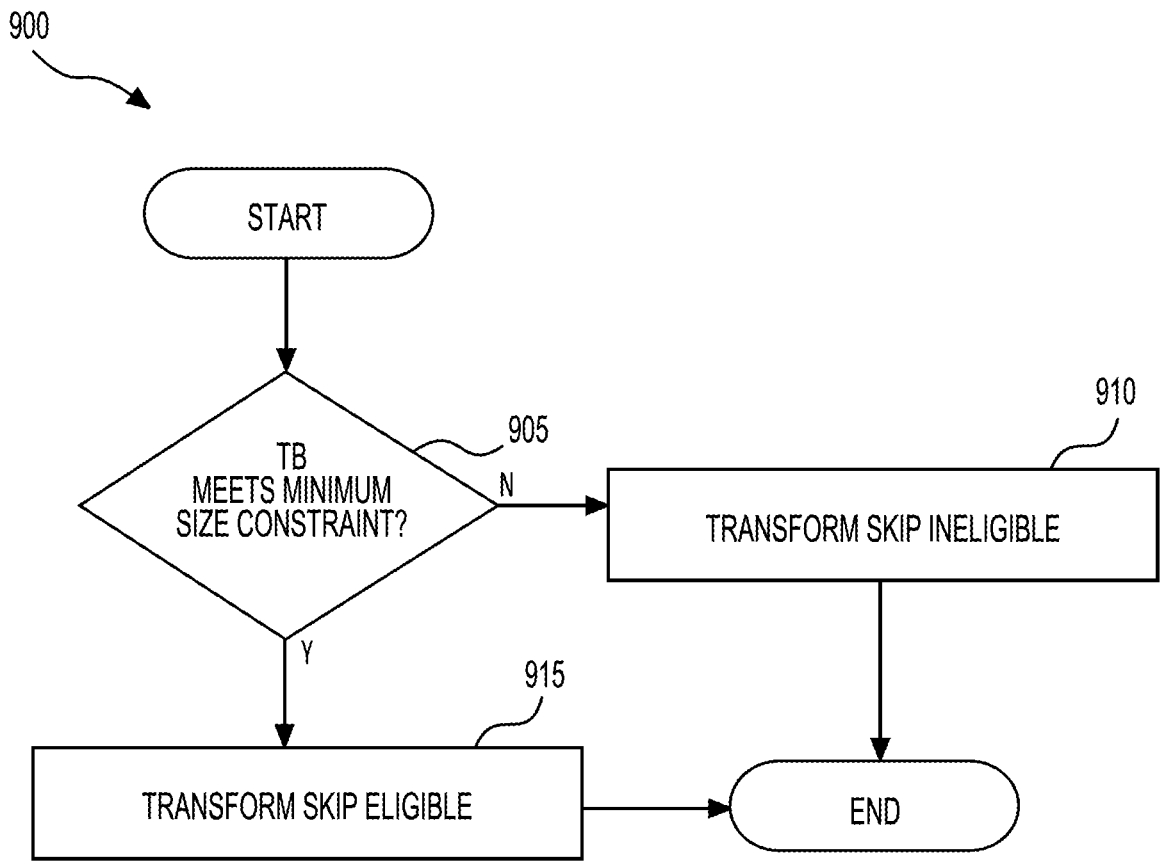
FIG. 9 is a flow diagram of another example transform skip process by which the present inventive concept can be embodied.

FIG. 9 is a flow diagram of an example transform skip evaluation process 900. In operation 905, it is determined whether a TB under scrutiny meets a minimum size constraint, such as by determining whether the number of block samples is equal to or greater than 1<<(log 2_min_transform_skip_block_size<<1). If so, process 900 may transition to operation 915, where the TB is indicated as transform-skip eligible with respect to minimum size constraints. If the TB does not meet the minimum size constraint, operation 900 may transition to operation 910, by which the TB under scrutiny is deemed ineligible for transform skipping.

In another embodiment, pre-defined values are included for TB dimension constraints when the related information is not explicitly signaled in the bitstream. The different constraint values can be defined for different color components. In one example, the minimum transform block size is set to equal 16 samples for all color components. In another example, the minimum transform block size is set to equal 16 samples for the luma component and to equal 64 samples for the two chroma components.

In embodiments of the invention, high-level syntax elements are implemented to support signaling the control setting of the transform skip mode separately for different color components. In this way, the use of the transform skip mode can be more effectively controlled for different color components with different sample statistical distributions. In one embodiment, two PPS syntax elements, luma_transform_skip_enabled_flag and chroma_transform_skip_enabled_flag, are employed to indicate if the transform skip mode can be applied to the luma transform blocks and the chroma transform blocks, respectively, in coded pictures referring to the PPS. Two PPS syntax elements luma_log 2_max_transform_skip_block_size and chroma_log 2_max_ transform_skip_block_size may be employed to signal the maximum transform block size for the luma component and the two chroma components, respectively, for enabling the transform skip mode in coded pictures referring to the PPS. Another PPS syntax element, transform_skip_chroma_present_flag, is added to indicate if the syntax elements related to the chroma component(s) are separately signaled. If transform_skip_chroma_present_flag is equal to 0, the syntax values for the chroma components are set to the values of the corresponding luma syntax elements. Otherwise, the syntax values for the chroma components are independent of the syntax values for the luma component. The high-level syntax elements can be present in the syntax structures SPS, PPS, slice segment header, and CTU.

Figure 10A:
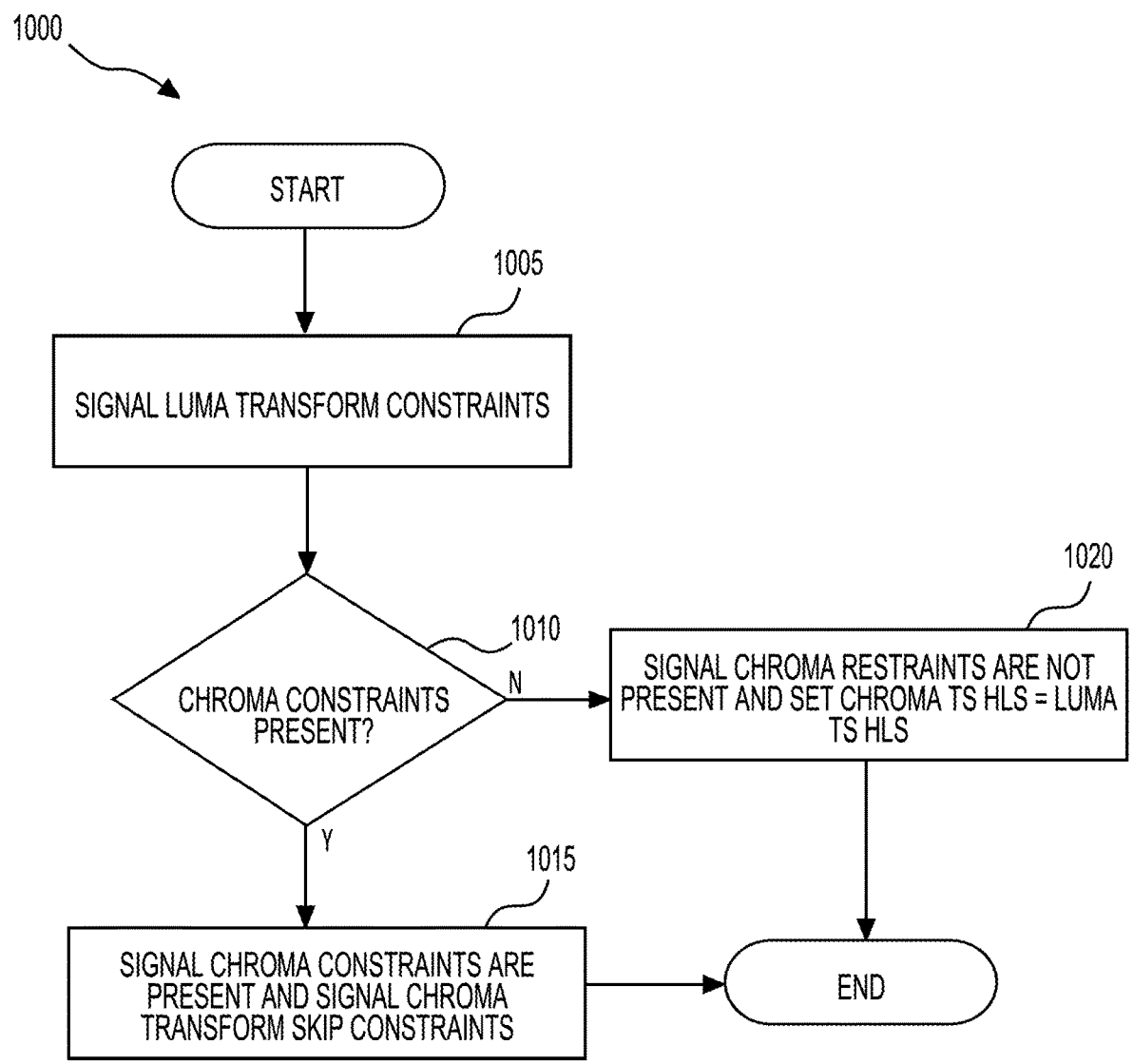
FIG. 10A is a flow diagram of luma and chroma block processing by which the present inventive concept can be embodied.

FIG. 10A is a flow diagram of an example independent block processing determination process 1000 by which the present invention can be embodied. In operation 1005, luma transform constraints are signaled and, in operation 1010, it is determined whether chroma constraints are also present. If so, process 1000 may transition to operation 1015, whereby it is signaled that chroma constraints are present, such as through transform_skip_chroma_present_flag and the chroma transform skip constraints are also signaled independently of the luma transform skip constraints. Otherwise, process 1000 may transition to operation 1020, by which it is signaled that chroma constraints are not present and chroma transform skip HLS elements are set identically to the luma HLS element settings.

Figure 10B:
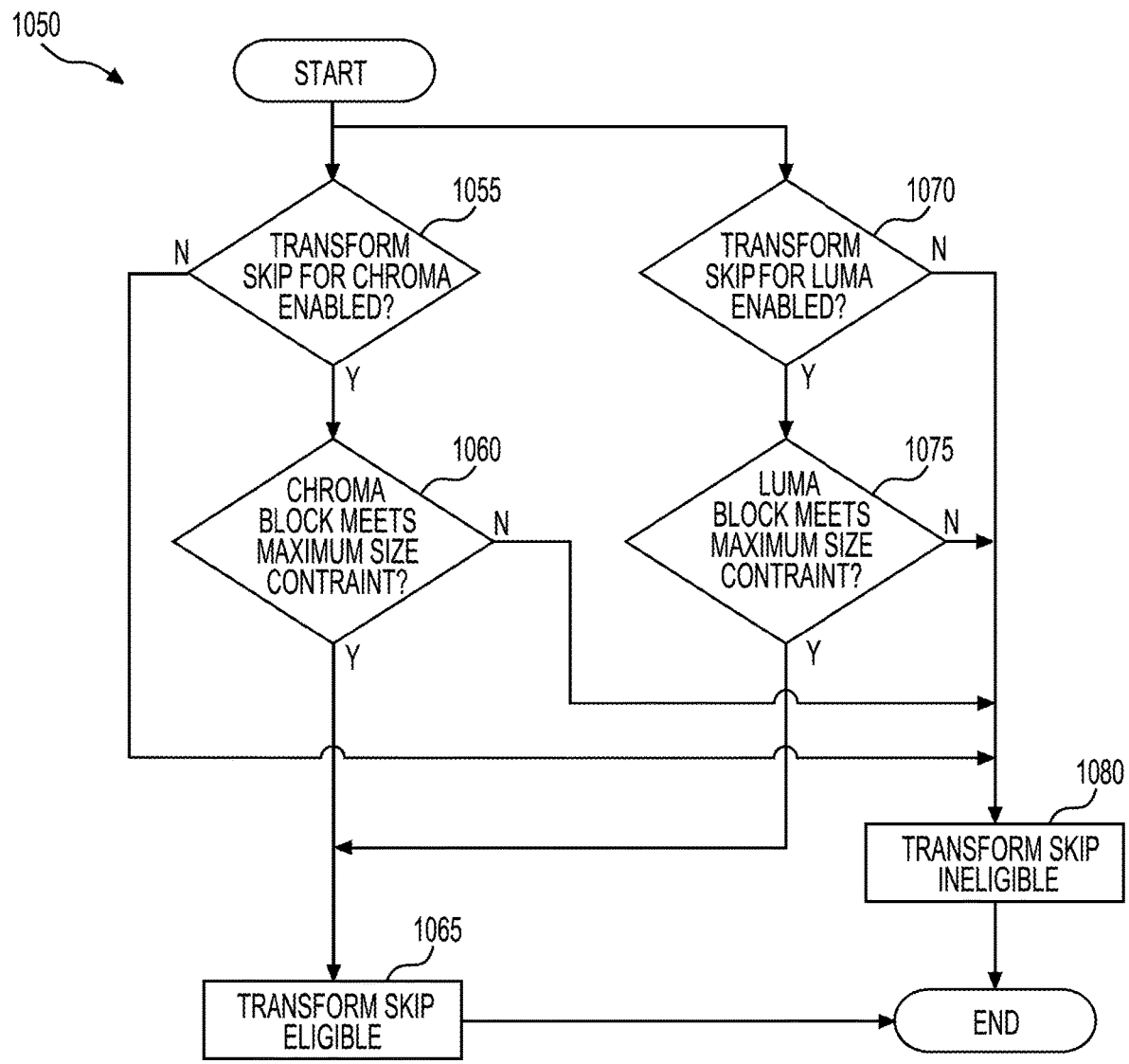
FIG. 10B is a flow diagram of another example transform skip process by which the present inventive concept can be embodied.

FIG. 10B is a flow diagram of an example transform skip evaluation process 1050, where chroma block transform skipping is independent of luma block transform skipping. If it is determined that luma and chroma transform skipping are controlled by independent HLS elements, as determined by process 1000, process 1050 begins at operation 1055, whereby it is determined whether transform skip is enabled for chroma blocks, such as by evaluating chroma_transform_ skip_enabled_flag. If transform skipping is enabled for chroma blocks, process 1050 may transition to operation 1060 by which it is determined whether the chroma block meets the maximum size constraint, such as by evaluating chroma_log 2_max_transform_skip_block_size. If so, process 1050 may transition to operation 1065 by which the TB under scrutiny is deemed eligible for transform skipping. Otherwise, process 1050 may transition to operation 1080 by which the TB is considered ineligible for transform skipping. Process 1050 may also transition to operation 1080 in response to determining at operation 1055 that transform skipping is not enabled for chroma blocks.

At operation 1070, it is determined whether transform skipping is enabled for luma blocks, such as by evaluating luma_transform_skip_enabled_flag. If transform skipping is enabled for luma blocks, process 1050 may transition to operation 1075 by which it is determined whether the luma block meets the maximum size constraint, such as by evaluating luma_log 2_max_transform_skip_block_size. If so, process 1050 may transition to operation 1065 by which the TB under scrutiny is deemed eligible for transform skipping. Otherwise, process 1050 may transition to operation 1080 by which the TB is considered ineligible for transform skipping. Process 1050 may also transition to operation 1080 in response to determining at operation 1070 that transform skipping is not enabled for luma blocks.

In certain embodiments, high-level syntax elements are implemented to support further modifications to the control setting of the transform skip mode in a picture region such as a tile, a slice, or a CTU (as opposed to the entire picture). In this way, more effective control over the use of the transform skip mode is obtained considering current picture content, and bitrate and complexity constraints. In one embodiment, a slice segment header syntax element slice_transform_skip_present_flag is used to indicate if the control setting of the transform skip mode signaled in the PPS syntax structure can be modified or replaced in the current slice segment. When slice_transform_skip_present_flag is equal to 0, the control setting of the transform skip mode signaled in the PPS syntax structure is applied to the current slice segment. Otherwise, the control setting of the transform skip mode can be modified in the current slice segment and further signal the modified control setting in the current slice segment header. The modified control setting signaled in the slice segment header can be predicted or restricted by the control setting of the referred PPS. For example, a syntax element slice_luma_log 2_max_transform_skip_block_size_ diff can be employed in a modification operation to indicate the maximum transform block size for enabling the transform skip mode in the current slice segment. The modified constraint on the maximum luma transform block size in the number of block samples can be set equal to 1<<((luma_log 2_max_transform_skip_block_size–slice_ luma_log 2_max_transform_skip_block_size_def)<<1).

A PPS syntax element pps_slice_transform_skip_adaptive_flag can be utilized to indicate if the control setting of the transform skip mode signaled in the PPS syntax structure can be modified in the slice header segments referring to the PPS. If pps_slice_transform_skip_adaptive_flag is equal to 0, slice_transform_skip_present_flag is inferred to be equal to 0 and the control setting of the transform skip mode signaled in the PPS is applied to coded slice segments referring to the PPS.

Figure 11:
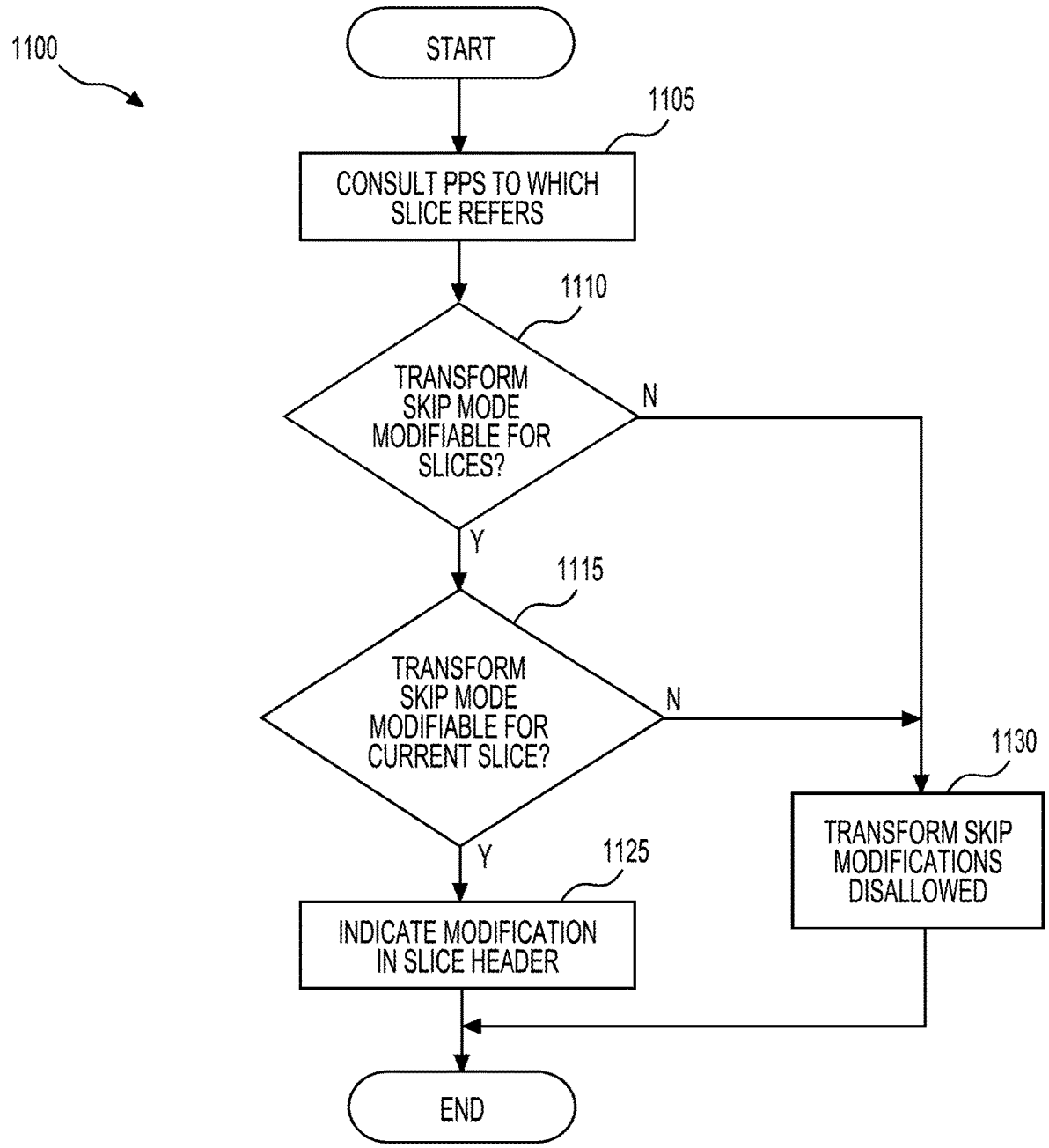
FIG. 11 is a flow diagram of another example transform skip process by which the present inventive concept can be embodied.

FIG. 11 is a flow diagram of an example transform skip evaluation process 1100. In operation 1105, the PPS to which a slice refers is consulted as to its HLS elements. In operation 1110, it is determined whether the transform skip mode is modifiable in slices, such as by evaluating pps_slice_transform_skip_adaptive_flag. If so, it is determined in operation 1115 whether the transform skip mode is modifiable for the slice under scrutiny, such as by evaluating slice_transform_skip_present_flag. Otherwise, process 1100 may transition to operation 1130, by which transform skip modifications are disallowed. Process 1100 may also transition to operation 1130 if it is determined at operation 1110 that the transform skip mode is not modifiable for slices.

If it is determined at operation 1115 that the transform skip mode is modifiable at the slice level, process 1100 may transition to operation 1125 by which a modification, such as adjusting the size constraint luma_log 2 max_transform_skip_block_size by an amount slice_luma_log 2_max_transform_skip_block_size_diff is indicated in the slice header.

It is to be understood that names of the HLS elements described above are for purposes of explanation and are not intended to be limiting. That is, other syntax element names can be used to achieve the same results if the associated functionality described herein is realized.

HLS constraints may be determined experimentally for input video data considering a trade-off between complexity and efficiency. The constraints may also be dynamically adjusted by evaluating the coded data in previous frames in decoding order to evaluate rate-distortion efficiency.

System 100 may be implemented in a client-server system, database system, virtual desktop system, distributed computer system, cloud-based system, clustered database, data center, storage area network (SAN), or in any other suitable system, for example in a system designed for the provision of video content or the like.

The storage areas and memory circuitry described herein may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity.

The processor circuitry described herein is, for example, one or more data processing devices such as microprocessors, microcontrollers, systems on a chip (SOCs), or other fixed or programmable logic, that executes instructions for process logic stored in the memory. The processors may themselves be multi-processors, and have multiple CPUs, multiple cores, multiple dies comprising multiple processors, etc.

Client devices 140 may be any conventional or other computer system or device, such as a thin client, computer terminal or workstation, personal desktop computer, laptop or netbook, tablet, cellular phone, networked television, or other device capable of acting as a client.

Server devices 110 and client devices 140 are communicatively connected to each other, for example, via network 150, which represents any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the system may include any conventional or other communications devices to communicate over the networks via any conventional or other protocols, and may utilize any type of connection (e.g., wired, wireless, etc.) for access to the network.

The system may include additional servers, clients, and other devices not shown, and individual components of the system may occur either singly or in multiples, or for example, the functionality of various components may be combined into a single device or split among multiple devices. It is understood that any of the various components of the system may be local to one another, or may be remote from and in communication with one or more other components via any suitable means, for example a network such as a WAN, a LAN, Internet, Intranet, mobile wireless, etc.

User interfaces 160 and 179 may comprise a graphical user interface (GUI) under control of the processor circuitry described hereon. The processor circuitry is, for example, a data processing device such as a microprocessor, microcontroller, system on a chip (SOCs), or other fixed or programmable logic, that executes instructions for process logic stored in the memory circuitry. Display rendering hardware may be a part of the processor circuitry or may be, e.g., a separate Graphics Processor Unit (GPU).

Server devices 110 and client devices 140 may each be implemented in the form of a processing system, or may be in the form of software. They can each be implemented by any quantity of conventional or other computer systems or devices, such as a computing blade or blade server, thin client, computer terminal or workstation, personal computer, cellular phone or personal data assistant (PDA), or any other suitable device. A processing system may include any available operating system and any available software (e.g., browser software, communications software, word processing software, etc.). These systems may include processors, memories, internal or external communications devices (e.g., modem, network card, etc.), displays, and input devices (e.g., physical keyboard, touch screen, mouse, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., an object oriented programming language such as Java, Smalltalk, C++ or the like, or a conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C++, Java, P1/1, Fortran or other programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. A method of coding video data by an encoder, the method comprising:
    partitioning a picture defined in the video data into blocks that include a luminance (luma) transform block and a chrominance (chroma) transform block;
    determining from high-level syntax elements a maximum luma picture block size constraint defining a maximum luma picture block size for which the luma picture block is eligible for transform skipping and a maximum chroma picture block size constraint defining a maximum chroma picture block size for which the chroma picture block is eligible for transform skipping, the maximum luma picture block size constraint being independent of the maximum chroma picture block size constraint;
    disallowing transform skipping of one of the 1 luma transform block and the chroma transform block responsive to the constraints not being met in picture regions referring to the high-level syntax elements; and
    encoding the video data in a bitstream along with an indication that the transform of the luma transform block or the chroma transform block is skipped in response to the transform being skipped.

2. The method of claim 1 further comprising:
determining from the high level syntax elements whether the luma transform block is a candidate for transform skipping independently of whether the chroma block is a candidate for transform skipping.

3. The method of claim 1 further comprising:
encoding the video data in the bitstream along with an indication that the transform of the luma transform block is skipped independently of an indication that the transform of the chroma transform block is skipped.

4. The method of claim 1 further comprising:
determining from the high-level syntax elements whether the constraints pertaining to the picture of a slice are allowed modification;
encoding the video data in the bitstream along with an indication of the modification.

5. An encoder apparatus comprising:
memory circuitry to store a picture defined in video data; and
processor circuitry configured to:
partition the picture into blocks that include a luminance (luma) transform block and a chrominance (chroma) transform block;
determine from high-level syntax elements a maximum luma picture block size constraint defining a maximum luma picture block size for which the luma picture block is eligible for transform skipping and a maximum chroma picture block size constraint defining a maximum chroma picture block size for which the chroma picture block is eligible for transform skipping, the maximum luma picture block size constraint being independent of the maximum chroma picture block size constraint;
disallow transform skipping of one of the luma transform block and the chroma transform block responsive to the constraints not being met in picture regions referring to the high-level syntax elements; and
encode the video data in a bitstream along with an indication that the transform of the luma transform block or the chroma transform block is skipped in response to the transform being skipped.

6. A method of decoding video data, the method comprising:
partitioning a picture defined in the video data into blocks that include a luminance (luma) transform block and a chrominance (chroma) transform block;
determining from high-level syntax elements a maximum luma picture block size constraint defining a maximum luma picture block size for which the luma picture block is eligible for transform skipping and a maximum chroma picture block size constraint defining a maximum chroma picture block size for which the chroma picture block is eligible for transform skipping, the maximum luma picture block size constraint being independent of the maximum chroma picture block size constraint;
disallowing transform skipping of one of the luma transform block and the chroma transform block responsive to the constraints not being met in picture regions referring to the high-level syntax elements; and
decoding the video data in a bitstream along with an indication that the transform of the luma transform block or the chroma transform block is skipped in response to the transform being skipped.

\* \* \* \* \*